March 30, 1937.  E. E. WINKLEY  2,075,250
MEASURING MACHINE
Filed Aug. 3, 1933  8 Sheets-Sheet 1

INVENTOR.
Erastus E. Winkley
By his Attorney
Horace M. Davis

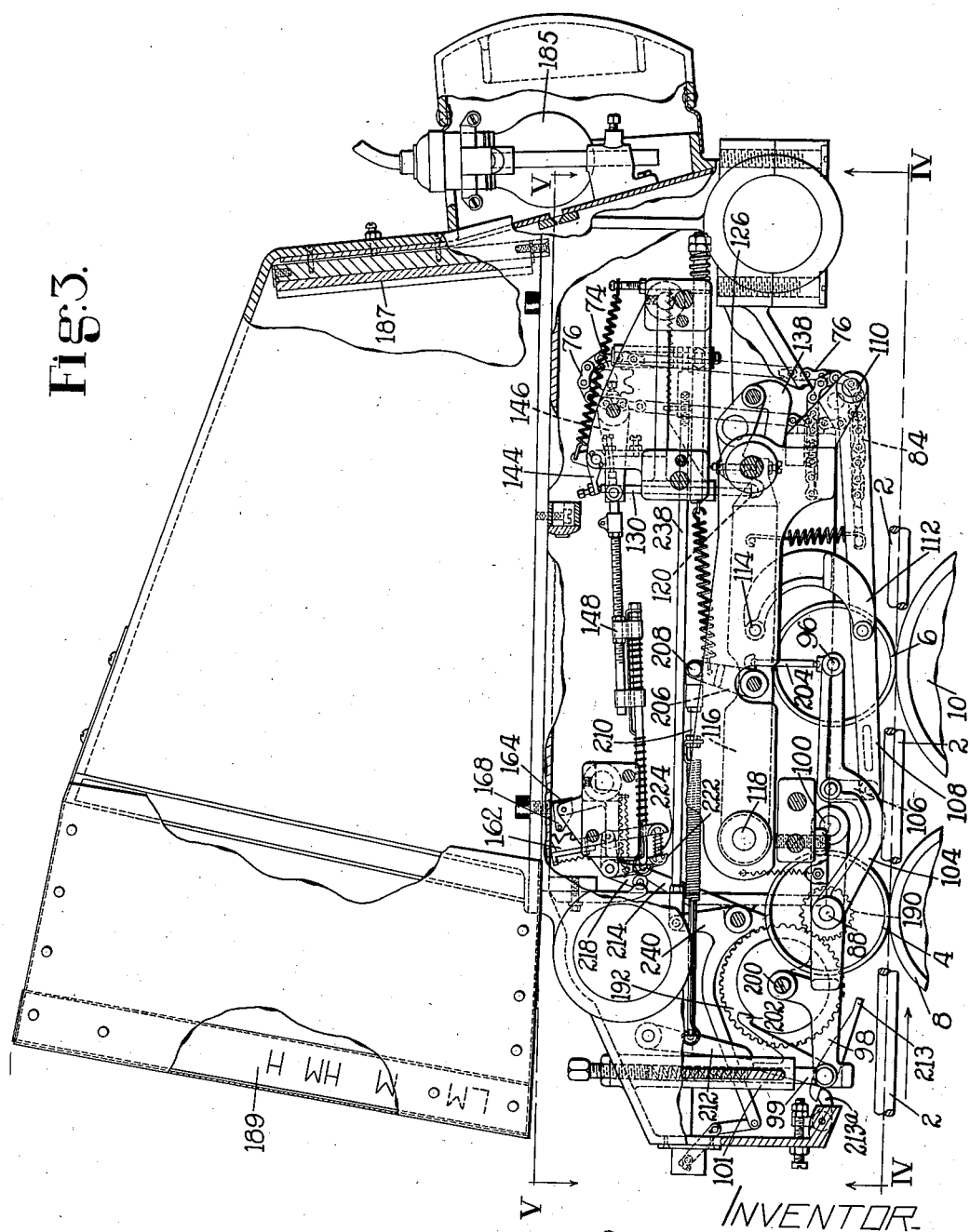

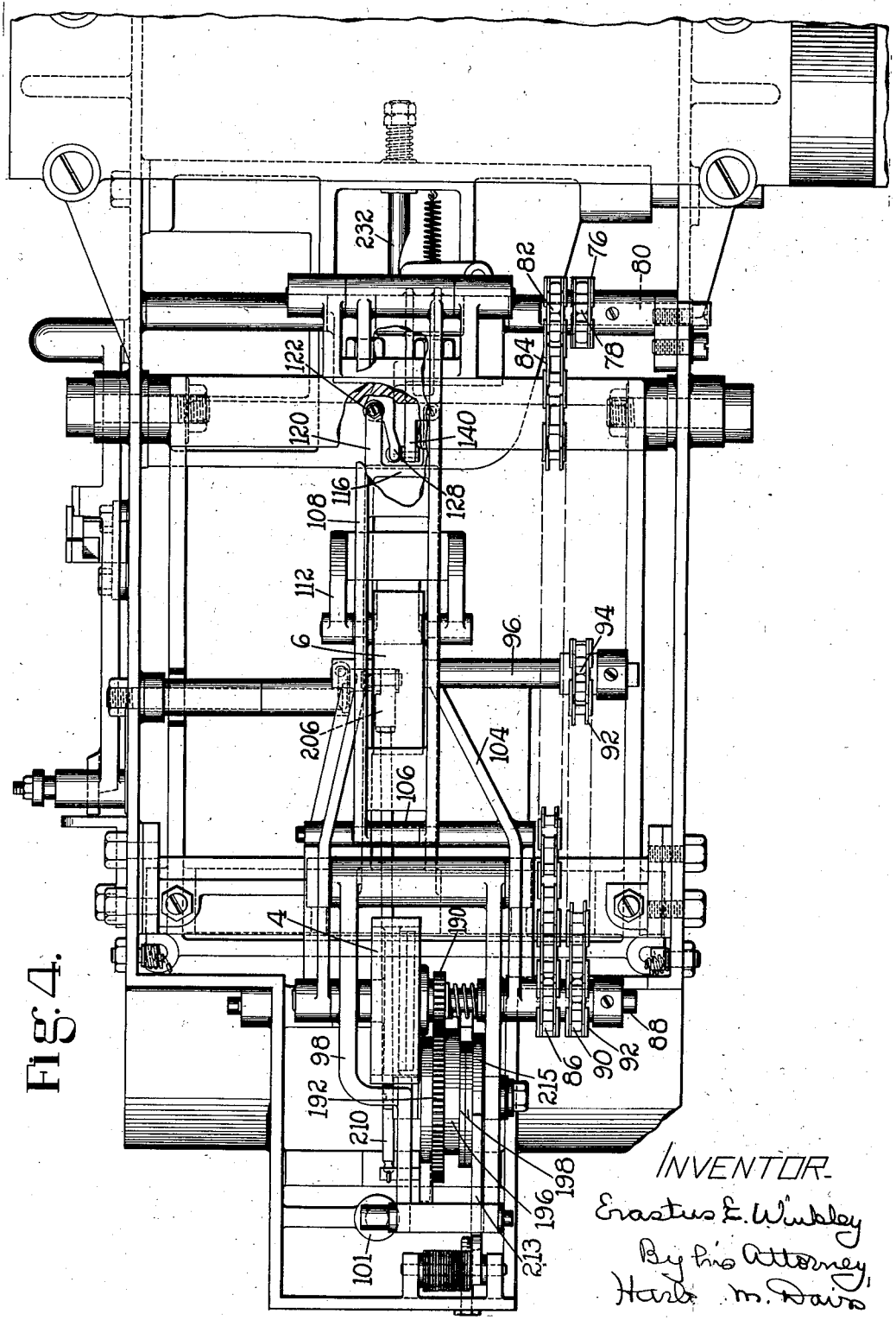

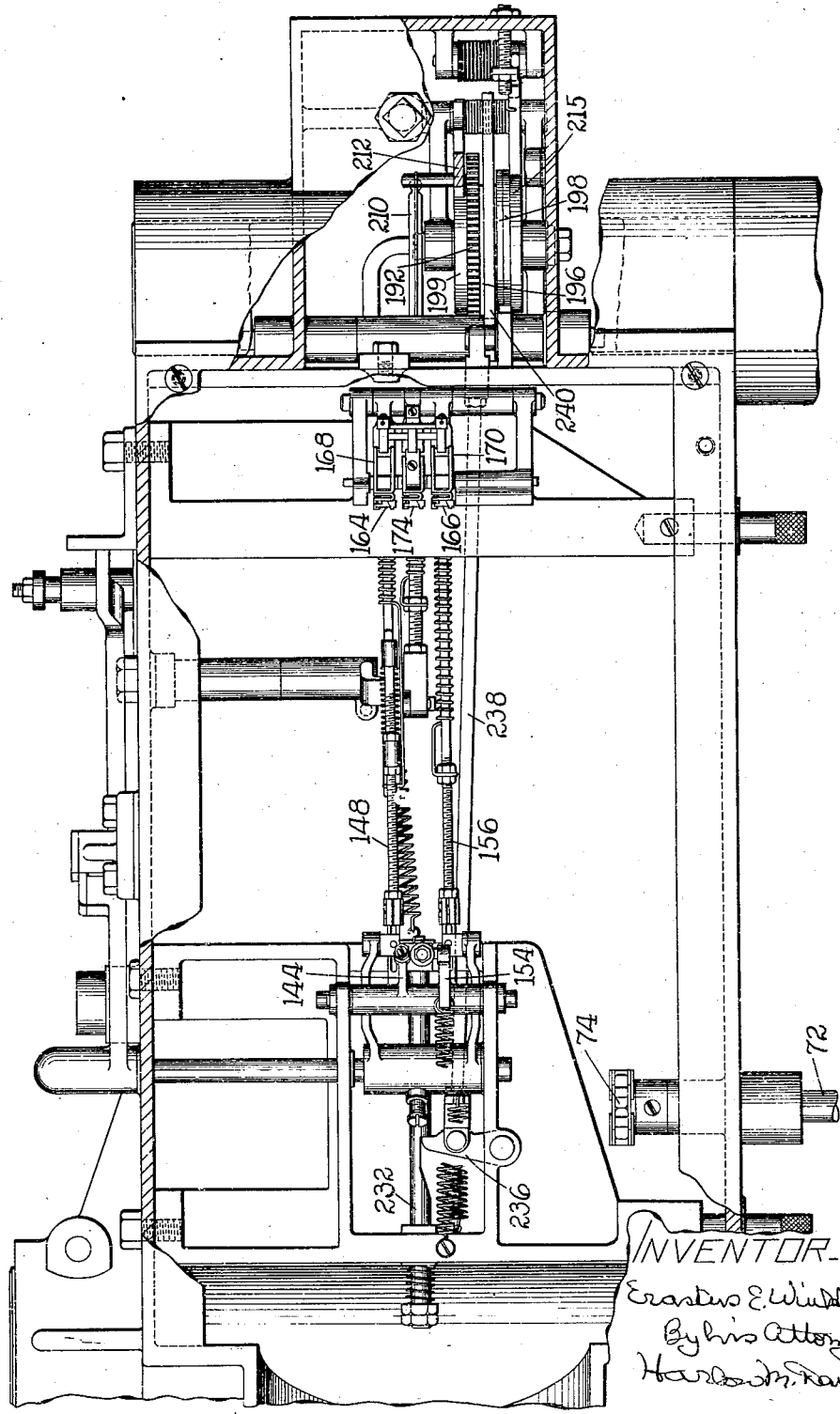

March 30, 1937.  E. E. WINKLEY  2,075,250
MEASURING MACHINE
Filed Aug. 3, 1933  8 Sheets-Sheet 6

INVENTOR.
Erastus E. Winkley
By his Attorney,
Harlow B. Davis

March 30, 1937.  E. E. WINKLEY  2,075,250
MEASURING MACHINE
Filed Aug. 3, 1933  8 Sheets-Sheet 7
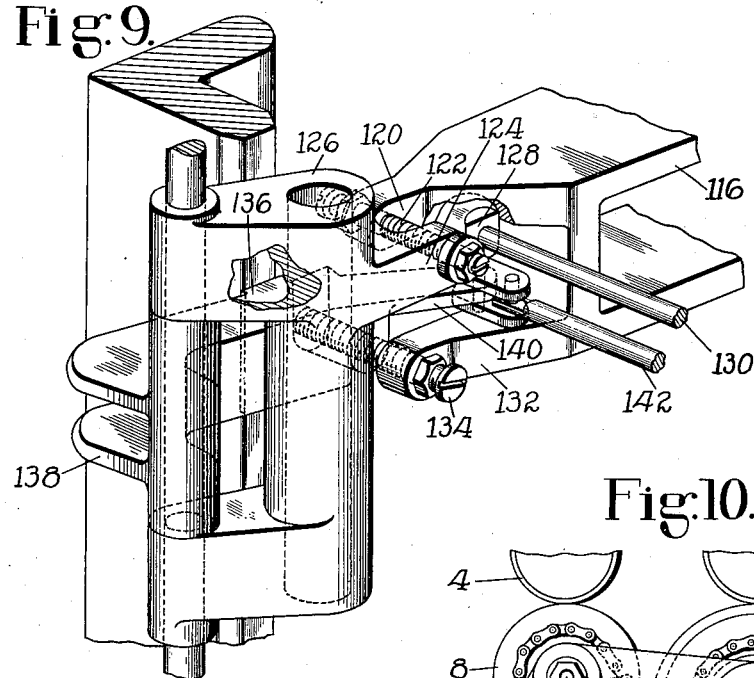
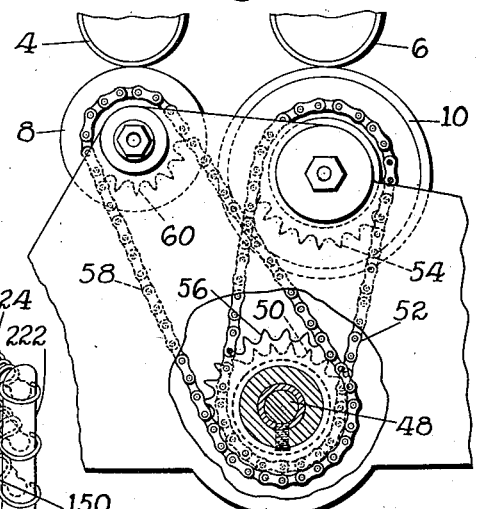
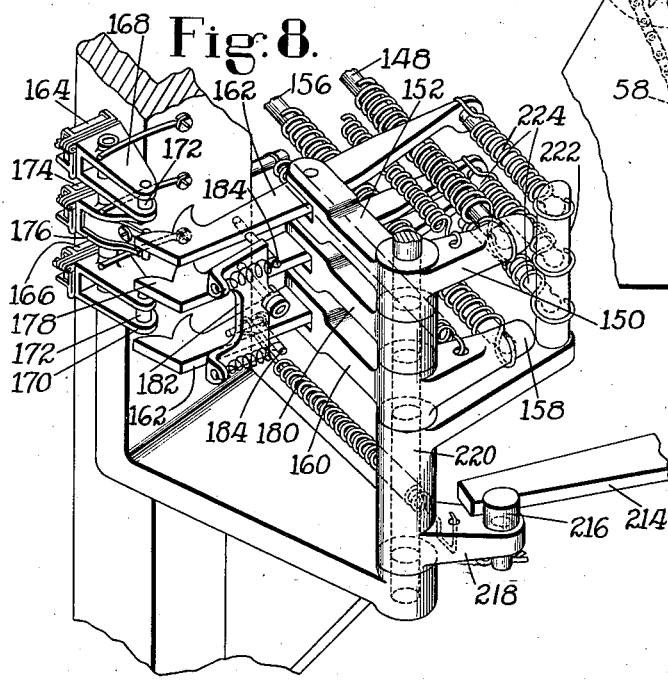
INVENTOR
Erastus E. Winkley
By his Attorney
Harlow M. Davis March 30, 1937.  E. E. WINKLEY  2,075,250
MEASURING MACHINE.
Filed Aug. 3, 1933  8 Sheets-Sheet 8
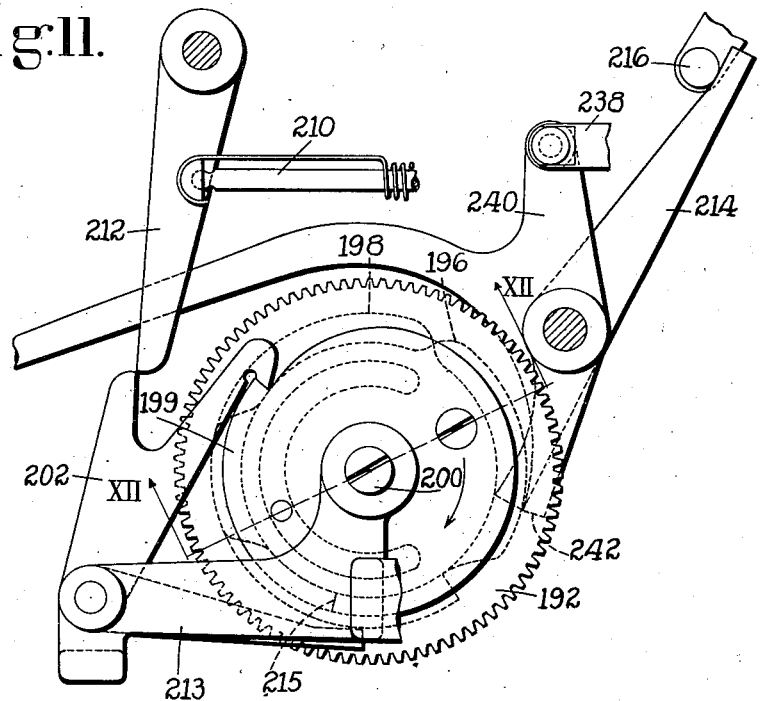
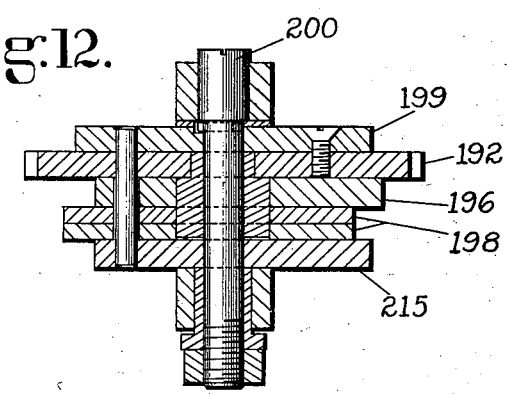
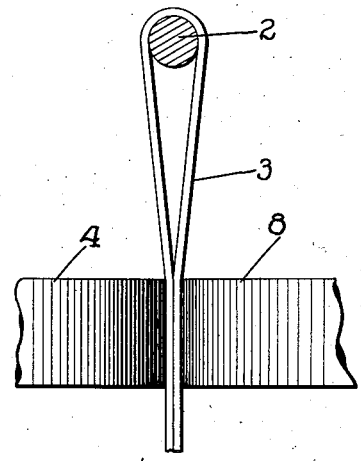
INVENTOR
Erastus E. Winkley
By his Attorney
Harlow M. Davis Patented Mar. 30, 1937

2,075,250

UNITED STATES PATENT OFFICE 2,075,250

MEASURING MACHINE

Erastus E. Winkley, Lynn, Mass., assignor to The Turner Tanning Machinery Company, Portland, Maine, a corporation of Maine Application August 3, 1933, Serial No. 683,491

24 Claims. (Cl. 33—148)

This invention relates to machines for measuring dimensions of pieces of work and more particularly to machines for measuring thickness dimensions of hides, skins, and pieces of leather. It is to be understood, however, that the invention and various important features thereof may have other applications and uses.

It is a well-known fact that the thickness dimensions of hides and skins vary considerably in different areas thereof and sometimes quite substantially in areas closely adjacent to each other. Not only is this true of raw hides and skins but also of hides and skins which have been tanned. In most cases the inequalities of the thickness dimensions of hides and skins are maintained in the tanned article. Furthermore, other inequalities are actually produced during various operations to which hides and skins are ordinarily subjected preliminarily to tanning. For instance, hides and skins are commonly fleshed after the liming and unhairing operations, and in the fleshing operation inequalities are produced on the flesh surface since the machines are not constructed to perform a highly finished cutting operation but are only moderately efficient in removing tissue from the flesh surfaces of the hides or skins. Again skins are commonly weighted, that is, measured for thickness, after they are tanned, and usually after they have been shaved on the flesh surface. Even after the shaving operation the skin is unequal in its thickness dimensions in various portions thereof. Indeed, it is the practice of some tanners to shave certain classes of skins only over the neck and butt ends thereof, leaving the intermediate back portions unshaved. For all of these reasons the difference between the maximum point of thickness in a given hide or skin and the point of minimum thickness, encountered in measuring operations upon the same hide or skin, is liable to be so great that an averaging of such maximum and minimum thickness dimensions does not represent a sufficiently accurate determination of the thickness of a given hide or skin for certain purposes, it being understood that both hides and skins are sorted more or less accurately prior to some operations, and skins always with extreme care prior to being offered for sale.

It is an object of this invention to secure a more accurate determination of the thickness dimensions of hides and skins. This is accomplished in the illustrated construction by minimizing the effect of thicker and thinner spots or areas encountered by the thickness detector or calipering means in the operation of measuring a hide or skin. It will be clear that a hide or skin cannot be properly graded with reference to its thickest area or its thinnest area but that an average must be obtained making due allowance for the thickest and thinnest areas in the piece of work undergoing measurement. It is a further object of the invention to measure thickness dimensions of pieces of work, particularly of skins and leather made therefrom, in a manner simulating that employed by skilled operators who weight leather by hand. In such an operation the leather is folded either along the backbone line or along a line transverse thereto, and then the thumb and fingers are drawn along the folded skin at a distance of an inch or two from the line of fold, the thumb being in opposition to the fingers in this feeling test of the leather. It will be understood that all leather offers a certain amount of resistance to bending and that it would not do to press the folded surfaces into contact with each other closely adjacent to the line of fold for in so doing a line would be pressed in the leather. Hence, the thumb and fingers are drawn along at a distance of an inch or so from the line of fold where the two layers of the leather will normally be easily pressed into contact with each other by slight pressure of the thumb and finger. Accordingly it is an object of the invention to provide thickness detector or calipering means which will engage the folded skin or leather in a manner similar to that employed by the skilled hand operator.

To these ends and in accordance with an important feature of the invention, there is provided a supporting means constructed and arranged to support and guide a folded piece of work in such manner that calipers for the work will engage the latter at points in a line spaced a suitable distance from the fold in the work. Conveniently, the work supporting means comprises a member upon which each piece of work is suspended by first folding it along a given line and then hanging it over the supporting member, the said supporting member having its width and thickness dimensions minimized in respect to its length dimension and being arranged to cooperate with a thickness detector or calipering means operative to engage the double layer of material a suitable distance from its line of support. As pointed out above, this arrangement has the advantage of calipering the thickness of the work along lines, that is, in places, where measurement has been made of skins and leather in accordance with methods employed by generations of tanners. Hence, if the machine measurements are reasonably accurate they will correspond to measurements obtained by the hand expert at his best and have the additional advantage of being performed without the variations so characteristic of hand operations, and with correspondingly desirable results. In the illustrated machine, the work supporting member is a traveling cable over which each folded piece of work is placed and by which it is carried through the field of calipering operations. In connection with this cable, there is conveniently provided a combined guard and work support at the work receiving end of the cable to facilitate placing of the pieces of work on the cable. Preferably and as shown there is also a work receiving member at the delivery end of the cable, thus insuring that the work will not be discharged from the cable if the workman happens to be engaged for the moment, it being understood that a worker at the rear of the machine has the duty of removing each piece of work following the measuring operation and placing it upon its appropriate pile or stack in accordance with the indication of the measurement indicating means.

In order to secure the most accurate results in the thickness measurement of skins and leather made therefrom, it has been proposed to avoid measuring operations upon both the neck and shoulder portions at the front end of the skin and/or upon the butt portions at the rear end thereof and to conduct measurements upon those portions only of the skin lying along each side of the backbone line or along a line transverse of the backbone line and between the neck portions on the one end and the butt portions on the other, it being possible to obtain these desirable results through the provision of suitable timing mechanism connected to control the measurement indicating means, all as described and claimed in my copending application, Serial No. 499,992, filed December 4, 1930, now Patent No. 1,987,811, granted January 15, 1935. It is an important feature of this invention that there is provided, in an organization of the kind just referred to, a plurality of detector or calipering members in line with each other in the direction of movement of the work so arranged as to average the thickness dimensions in portions of the work engaged at any given instant by the spaced detector or calipering members. The result is to moderate the effect which would be produced by a thick or thin spot in the work if the latter were given its full value by a single detector or calipering member. Hence a much more accurate determination is obtained of the average thickness of the skin or other piece of leather along the path over which measurements are made during travel of the work between and past the detector or calipering means. As illustrated, the calipering means comprise two rolls or wheels mounted upon pivoted members extending in the direction of travel of the work and comprising an equalizing lever so arranged as to average the thickness dimensions at the spots in the work engaged at a given moment, the average movement of the calipering wheels being transmitted through connections to an indicating means which may be and preferably is of the type disclosed in my said copending application. Conveniently, the timing mechanism for the indicating means is driven by the calipering roll first encountered by the work and its operations controlled by the second calipering roll.

In certain cases it is desirable to measure hides, skins and pieces of leather while in a wet condition as, for instance, after tanning and prior to dyeing operations. For feeding this wet stock to and through detector or calipering means, the traveling cable is particularly advantageous since it would be difficult, if not impossible, to feed wet stock by any of the feeding means heretofore employed in thickness measuring machines. In order to feed wet stock smoothly, without wrinkles or folds, and thus secure the best results in thickness measuring operations upon such stock, the calipering rolls, as well as the work-backing rolls which cooperate therewith in calipering operations, are provided with driving means timed with respect to the driving means for the cable and operative to secure the same peripheral speed in all of the work engaging rolls, said speed being equivalent to that of the traveling cable.

These and other important features of the invention and novel combinations of parts will now be described in detail in the specification and then pointed out more particularly in the appended claims.

In the drawings,

Fig. 3 is a partial top plan view, partly in section, of the machine of Fig. 1, showing the calipering and indicating means;

Fig. 4 is a vertical sectional view taken along the line IV—IV of Fig. 3 looking in the direction of the arrows;

Fig. 5 is a view along the line V—V of Fig. 3;

Fig. 8 is an enlarged detail view of the indicating mirrors and the operating means therefor;

Fig. 9 is an enlarged view showing part of the connecting means between the calipering rolls and the indicating means;

Fig. 10 is a detail view showing the driving means for the rolls which back the work against the thrust of the calipering rolls;

Fig. 11 is a detail view of timing mechanism shown at the left in Fig. 3 of the drawings;

Fig. 12 is a sectional view along the line XII—XII of Fig. 11; and

Fig. 13 is a detail view along the line XIII—XIII of Fig. 1.

In the illustrated machine, which is especially designed for performing thickness measurements upon skins and other similar pieces of leather, there is provided an endless cable 2 (Figs. 1 and 3) upon which each piece of work 3 is supported while folded either along the backbone line, in the case of a skin, or along a line transverse thereto or along some similar line. In other words, the piece of work hangs suspended from the cable 2 and is carried thereby past calipering rolls 4 and 6, the piece of work being supported against the thrust of the calipering rolls 4 and 6 by rolls 8 and 10, respectively. Since the rolls 8 and 10 are stationary in space the calipering rolls 4 and 6 move toward and away from rolls 8 and 10, respectively, during calipering operations upon the work. It is to be understood that the cable 2 in its operative run supports the work in such manner that the pairs of rolls 4 and 8, 6 and 10, respectively, engage the folded work a substantial distance below the cable 2, as most clearly shown in Fig. 13. This distance is such that the double thickness of the work may be calipered without causing such bending of the work about the cable as to tend to form permanent lines marking the lines of bend. In this respect the operation is somewhat similar to that involved in judging the thickness dimensions of a folded skin since, in the latter case, the opposed thumb and fingers are drawn along the folded skin at a substantial distance from the line of fold so as not to press the two parts into firm contact with each other with the likelihood of forming a line more or less permanently in the work. Moreover, it is desired to caliper a whole skin or other piece of leather at a substantial distance from the backbone line since measurement along such a line parallel to the backbone line would result in testing for thickness the best portions of the skin.

Figure 1:
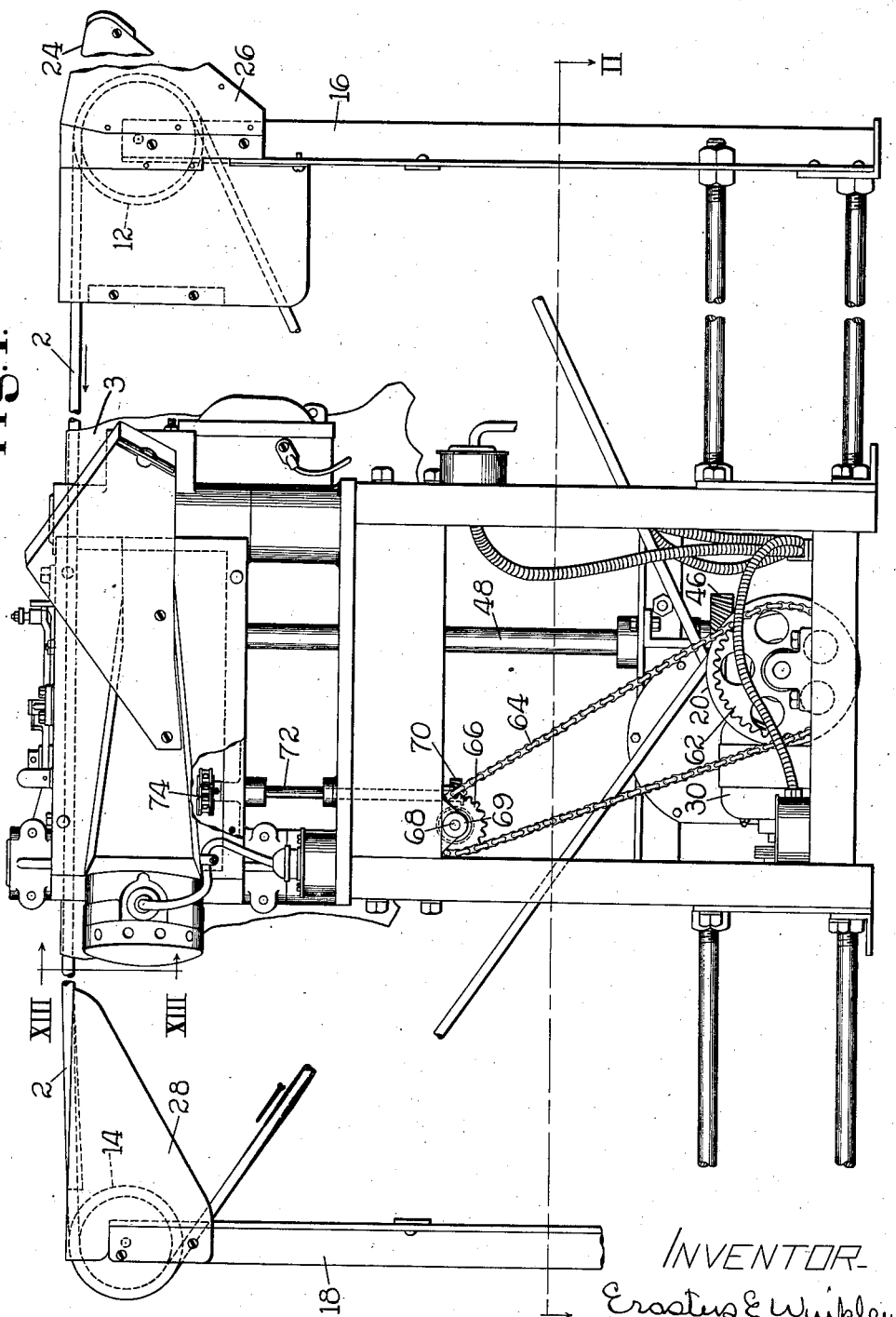
Fig. 1 is a view looking from the rear of a machine illustrating one embodiment of the invention.

Upon inspection of Fig. 1 it will be observed that the cable 2 is supported by idler pulleys 12 and 14 mounted for rotation at the upper end of standards 16 and 18, respectively. This cable 2 also passes around a pulley 20 (Figs. 1 and 2) fixed to a shaft 22 mounted for rotation in the machine frame and driven by power means which will be hereinafter described. At the upper end of the standard 16 there is provided a feeding-in table 24 the upper surface of which covers the adjacent portion of the cable 2. Extending downwardly from each longitudinal edge of the table 24 is a guard plate 26 useful in preventing the pieces of leather from engaging with an upwardly moving portion of the cable 2, this guard 26 being especially useful when wet stock is being fed by the cable for thickness measurements in the machine. It will be understood that the table 24 provides a supporting surface for the skin upon which it may be readily arranged in folded condition with parts hanging down on each side of the guard 26, the whole arrangement being such as to facilitate placing of the piece of work upon the cable 2 since it is only necessary to shove the work in the direction of the cable 2 (Fig. 1) to have it engage the latter and travel therewith. At its other end the cable 2 passes into a groove in the upper surface of a delivery table 28, this table being arranged to slant upwardly and outwardly, as indicated in Fig. 1, so that the leading end of the piece of work rides up on the delivery table and slightly away from the plane of the cable 2 so that the work is not dragged along with the cable but may rest in place on the delivery table 28 momentarily until the operator removes it.

Figure 2:
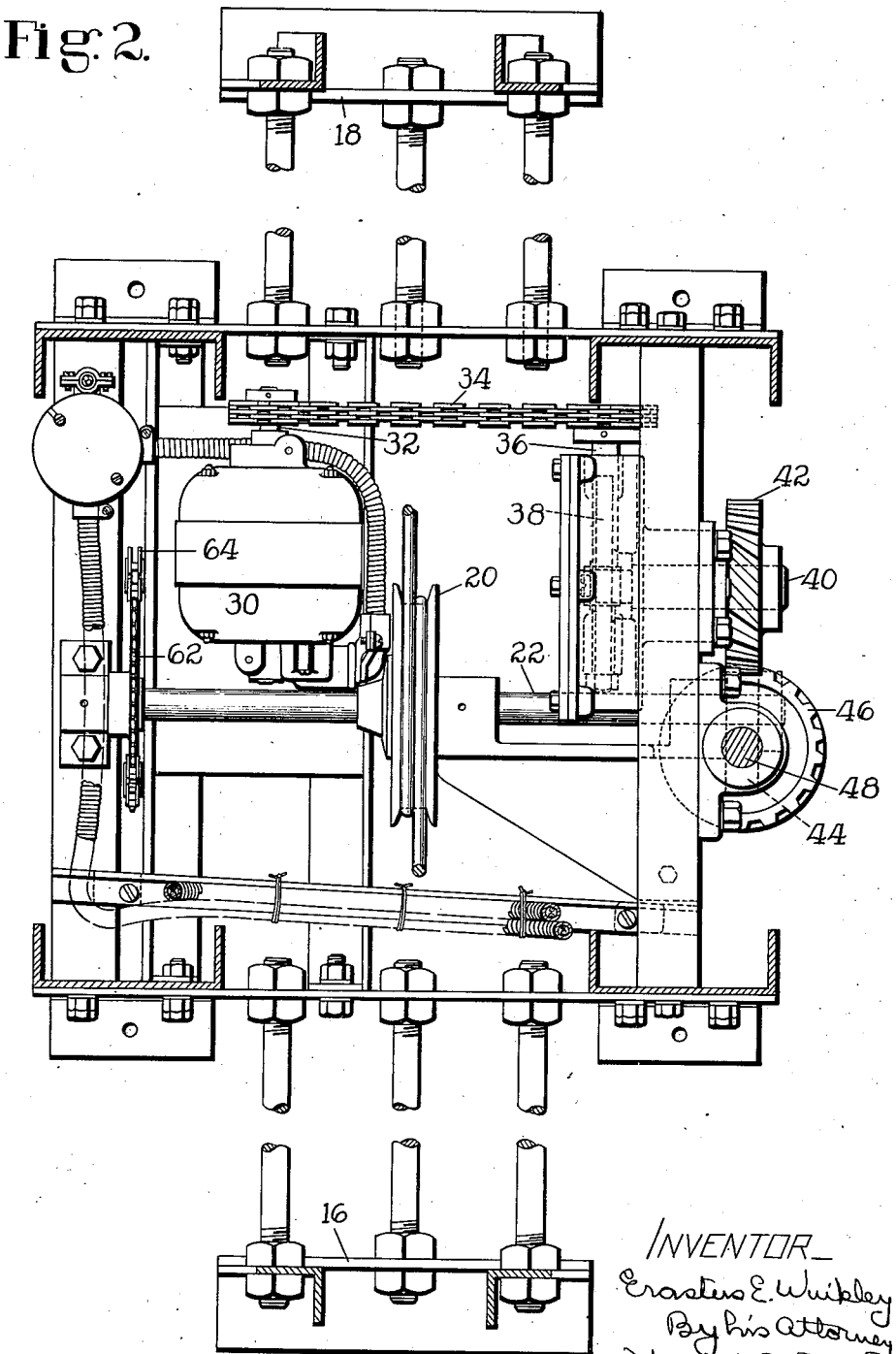
Fig. 2 is a sectional view along the line II—II of Fig. 1 looking in the direction of the arrows.

In order that the folded piece of work may travel smoothly, that is, in fully extended condition without wrinkles or folds through the bite of the two sets of rolls 4 and 8, 6 and 10, the latter are driven at the same peripheral speed and at a rate corresponding to that of the travel of the cable 2. It is for this reason that the rolls and the cable are preferably driven through interconnected means from the same source of power. Referring to Figs. 1 and 2 it will be seen that there is provided an electric motor 30 having an armature shaft 32 which carries a sprocket wheel about which passes a chain 34 which also engages a sprocket on a shaft 36 arranged to be connected by a worm (not shown) with a worm gear 38 fastened to a shaft 40, the latter carrying also a spiral gear 42 in mesh with a corresponding gear 44 fixed to the end of the shaft 22 to drive the latter. The spiral gear 42 also drives a spiral gear 46 fixed to the lower end of a shaft 48 (Figs. 1, 2 and 10). As most clearly shown in Fig. 10, the shaft 48 carries at its upper end a sprocket wheel 50 about which passes a chain 52 also engaging a sprocket wheel 54 on a shaft to which is secured the roll 10. The shaft 48 also carries a sprocket wheel 56 about which passes a chain 58 also arranged to engage a sprocket wheel 60 fixedly mounted upon a shaft which carries the roll 8, the ratio of the sprockets being such as to drive the rolls 8 and 10 at the same peripheral speed. At its other end the shaft 22 is provided with a sprocket wheel 62 (Figs. 1 and 2) about which passes a chain 64 also passing around a sprocket wheel 66 (Fig. 1) upon a stub shaft 68, the latter being provided with a worm 69 arranged in mesh with a worm gear 70 fastened to the lower end of a shaft 72 which carries at its upper end a sprocket wheel 74 (Figs. 1 and 3). About the sprocket wheel 74 there passes a chain 76 which engages also a sprocket 78 (Fig. 4) on a shaft 80, the latter carrying also, fixedly secured thereto, a sprocket wheel 82 about which passes a chain 84 which also engages with a sprocket 86 on a shaft 88 to which is fixed the calipering roll 4. Also secured to the shaft 88 is a second sprocket wheel 90 about which passes a chain 92 which engages a sprocket 94 on a shaft 96 to which is fixed the calipering roll 6. It will be understood that the gears and sprockets are so proportioned as to provide driving means for the cable 2 and for the rolls 4, 6, 8 and 10, such that the rolls are driven to travel at the same peripheral speed, equivalent to that of the cable 2, so that the work is smoothly fed through the field of calipering operations.

Referring now to Figs. 3 and 4 of the drawings, it will be observed that calipering roll 4 has its shaft 88 mounted in a lever 98 carried by a pivot pin 100 in the machine frame. The lever 98 is pressed upon by a spring plunger 99 in a casing 101. As shown, the calipering roll 6 is carried by the shaft 96 which is journaled in one end of an equalizing lever 104, the latter being pivotally connected at its center by a link 106 to a lever 108 pivoted at 110 in the frame of the machine. Pivoted to an intermediate portion of the lever 108 is a curved link member 112 whose other end is pivoted at 114 to a yoke member 116 in turn pivotally mounted at 118 in the machine frame, the yoke member 116 being operative to transmit movement of the calipering rolls 4 and 6 to an indicating means as will hereinafter be described. It will be clear upon inspection of Fig. 3 of the drawings that movements of either of the calipering rolls 4 and 6 are averaged through the equalizing lever 104 and that the averaged movement is transmitted through link 106, lever 108 and curved link 112 to the yoke member 116.

This yoke member 116 carries at its free end two fingers (Figs. 3, 4 and 9), one having an inwardly facing surface 120 adapted to contact with a set screw 122 carried by a finger 124 of a finger lever 126. Carried by the finger lever 126 is a second finger 128 having a surface with which contacts a connecting rod 130, the said rod being arranged to respond to movements of the calipering rolls 4 and 6 as the latter encounter successively thicker portions of the work, this being so for the reason that surface 120 pushes on the finger 124 only when the yoke member 116 is moved away from the plane of the work. The other finger 132 of the yoke member 116 carries a set screw 134 arranged to contact with a finger 136 of a finger lever 138, the latter carrying a second finger 140 to which is pivotally connected a connecting rod 142, the said rod 142 being so arranged as to be affected by movements of the calipering rolls 4 and 6 as the latter contact successively with thinner portions of a piece of work undergoing measurement, this being so for the reason that the screw 134 in finger 132 can push on the finger 136 only when the yoke member is moved toward the plane of the work by yielding means (not shown).

Figure 7:
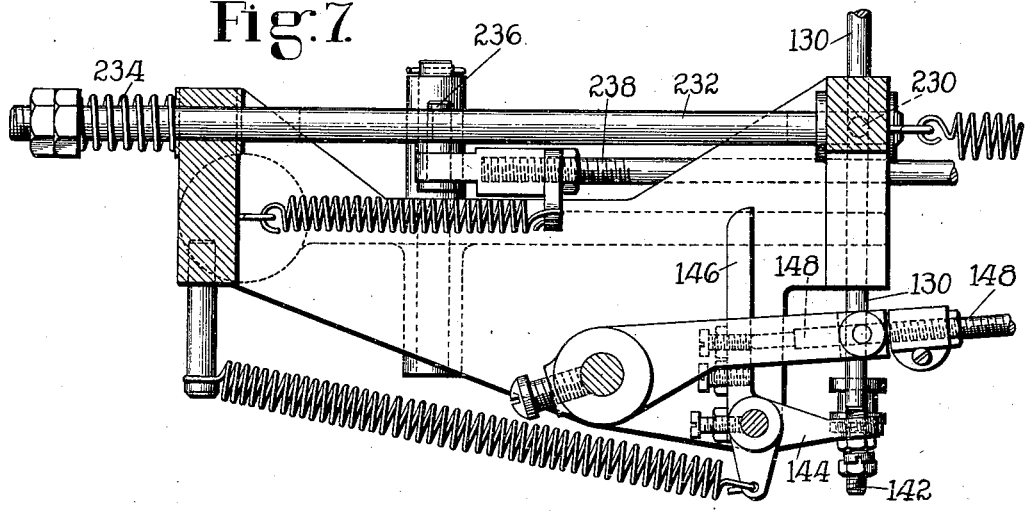
Fig. 7 is a view of the mechanism of Fig. 6 taken at a right angle thereto.
Figure 6:
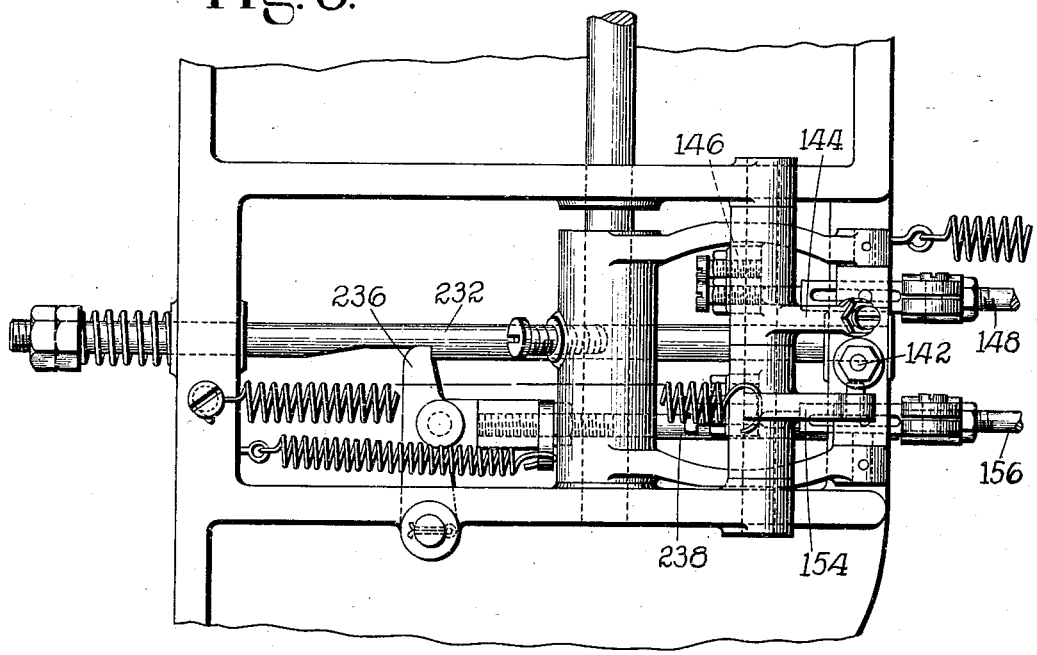
Fig. 6 is an enlarged detail view of the mechanism shown at the left end of Fig. 5.

At its upper end the connecting rod 130 contacts with a bellcrank lever 144 (Figs. 3, 6 and 7) having a downwardly projecting arm 146 with which there is engaged one end of a compound rod 148, the other end of which is seated in a socket in an arm 150 (Fig. 8) of a bellcrank lever 152. As shown in Figs. 6 and 7 the upper end of the connecting rod 142 is attached to a bellcrank lever 154 having a downwardly projecting arm similar to the arm 146 of bellcrank 144. Extending from the arm of the bellcrank 154 is a second compound rod 156 the other end of which is also socketed in a cup carried by an arm 158 of bellcrank lever 160. Hence movement of the connecting rods 130 and 142 results in effecting movements of the bellcranks 152 and 160, each of which carries a lever 162 pivoted at about its median point in the respective bellcrank.

The combination of connecting rods and levers described in the foregoing paragraph is for the purpose of effecting adjustment of individual indicator members which, in the illustrated construction, comprise mirrors 164, 166, respectively. These mirrors, as shown, are mounted in pivoted carriers 168, 170, respectively, the carriers being each provided with a crossbar 172 adapted to be engaged by the adjacent forked end of one of the levers 162. The indicating means comprises also a mirror 174 supported by a carrier 176 having a crossbar adapted to be contacted by the forked end of a lever 178, the latter being carried by a supporting lever 180 and having connections with the levers 162 through an equalizing lever 182 pivotally carried by the lever 178 and adapted to be operated by the levers 162 through pins 184 projecting therefrom. When the levers 162 are in operative position in engagement with the crossbars 172 of the mirror carriers 168, 170, 176, adjusting movements of the mirrors will be affected through the described connections as the calipering rolls 4 and 6 become operative to caliper the work during movement of the latter. Said mirrors reflect light from a lamp 185 (Fig. 3) to a mirror 187 and thence to an indicator scale 189 carrying characters arbitrarily chosen to represent various degrees of thickness—M for medium, H for heavy, etc.

If the indicating means were to be responsive to movements of the calipering rolls during passage of all portions of each piece of work past the calipering rolls, the levers 162 (Fig. 8) would remain always in operative position as just described in the foregoing paragraph. However, it is considered desirable to begin calipering operations at different predetermined distances from the entering end of the work and to discontinue indication operations before the rear end of the work is reached. In other words, only an intermediate portion of the work is really measured in measuring operations upon each piece of work. As hereinbefore indicated, the reason for this resides in the fact that the neck and butt portions of skins frequently vary so much in thickness, this being particularly true of the neck and shoulder portions of the skins, that a practical working method for determining the thickness dimensions of different skins is best arrived at by restricting measurements to the most desirable portions which lie along each side of the back bone line of the skin between the neck and butt portions thereof. For this reason, there is provided a timing mechanism under control of the caliper roll 4 for determining the time of operation of indicating means and for initiating such operation through positioning of the levers 162 in operative relation with respect to the mirror carriers as described above. Upon reference to Figs. 3, 11 and 12, it will be observed that the calipering wheel 4 has associated therewith a pinion 190 yieldingly mounted on the shaft 88 of the roll 4 and arranged to be constantly in mesh with a larger pinion 192 connected with cam members 196 and 198 on a shaft 200 carried by lever 98. When no work is present in the machine the timing mechanism, comprising cams 196 and 198, is held stationary by a locking pawl 202 in engagement with a locking disk 199, said pawl being pivotally mounted at the forward end of lever 98 and being moved to releasing position through means operated by the calipering roll 6, as will now be described.

The means referred to in the foregoing paragraph comprises a link 204 (Fig. 3) extending from the end of the link 104 at a point adjacent to the shaft 96 of the calipering roll 6. At its other end this link 204 contacts one arm of a bellcrank lever 206, the other arm of which is pivotally connected at 208 with a rod 210, the other end of which is pivotally connected to a lever 212 (Fig. 11), the arrangement being such that the lever 212 operates the locking pawl 202 to inoperative position, the pawl 202 on lever 98 having been moved upwardly into engaging position with respect to lever 212, from the position shown in Figs. 3 and 11, by the entrance of the work between the rolls 4 and 8. Since the pawl 202 is operated to releasing position through the described connections leading to calipering roll 6, the piece of work always travels the distance between the centers of the calipering rolls 4 and 6 before the pawl 202 is moved to releasing position. Rotation of the cams 196, 198 is stopped by locking pawl 213 (Figs. 3 and 11) engaging locking disk 215, the arrangement of locking shoulders on the disks 199 and 215 being such that, when one of the locking pawls 202 and 213 engages a shoulder on its co-operating locking disk, the other locking pawl cannot engage its locking shoulder, as clearly indicated in Fig. 11. Locking pawl 213 is pivotally carried at the front end of the lever 98 upon the pivotal mounting of the pawl 202, said pawl 213 having a forward extension to engage a stationary stop 213a. Hence the pawl 213 is moved to open position when roll 4 drops off the work. During its rotation the cam 198 operates a cam lever 214 to effect movement of the levers 162 (Fig. 8), to operative position with respect to the mirrors as before described, through contact of said lever 214 (Figs. 8 and 11) with a stud 216 in an arm 218 of a bellcrank lever 220. The cams 196 and 198 are adjustable with respect to the pinion 192 to vary the time of operation of the lever 214 as disclosed in detail in said copending application. As shown in Fig. 8, the bellcrank lever 220 has a finger projection 222 which furnishes socket portions of ball-and-socket joints for links 224 which connect the finger projection 222 with the lower ends of the levers 162 and 178. Hence, at the proper time the levers 162 and 178 are positioned in operative relation with respect to the mirror carriers 168, 170, 176.

As shown, the connecting rods 130, 142 (Figs. 3, 6, 7 and 9), are normally held yieldingly against movement in an endwise direction, the purpose being to permit each connecting rod 130, 142 to move in the desired direction to indicate the presence of either a thicker or a thinner spot in the path of travel of the calipering rolls 4 and 6 over the work and to maintain the position imposed thereon by the presentation of such thicker or thinner portion to the calipering rolls, so that eventually the connecting rod 130 attains a position which registers the effect of the thickest spot encountered by the calipering rolls while the connecting rod 142 reaches a position which registers the effect of the thinnest spot encountered by the calipering rolls in their path over the work. This means for yieldingly holding the connecting rods 130, 142 in the described positions comprises a cylinder 230 (Fig. 7) having beveled ends and located in a slot in a rod 232 (Figs. 3, 6, 7), a spring 234 being provided for holding the rod 232 and cylinder 230 in contact with the connecting rods 130, 142, as disclosed more in detail in said copending application. Since it is desired to release the rods 130, 142 so that they may be responsive to calipering operations upon a fresh piece of work, the said rod 232 is moved to releasing position at the beginning of calipering operations, the said movement being effected by a lever 236 (Figs. 6 and 7) which engages a shoulder on the rod 232, lever 236 being operated by a connecting rod 238 (Figs. 3, 6 and 7) pivoted to one end of a lever 240 (Figs. 3 and 11). Lever 240 is provided with an arm 242 arranged to project into the path of the cam 196 (Figs. 11 and 12), it being clear that, as the high part of the cam 196 engages the arm 242 of the lever 240, the rod 232 will be drawn to the right in Figs. 6 and 7 to effect momentary release of the connecting rods 130, 142. This release of the connecting rods 130 and 142 is timed to take place just before the levers 162 and 178 (Fig. 8) are moved to operative position through the operation of the lever 214 (Figs. 3, 8 and 11). Subsequently and before the cams are brought to rest by the locking pawl 213, the rods 130 and 142 are again yieldingly engaged by cylinder 230 in rod 232.

For a more detailed description of the connecting means between the connecting rods 130, 142 (Figs. 3 and 9) and the mirror carriers 168, 170 and 176, reference should be had to my copending application mentioned above.

Upon presenting a piece of work to the calipering roll 4, the latter is moved away from the roll 8 and in this movement the locking pawl 202 is positioned for engagement by the lever 212 which moves it to releasing position when the forward end of the work reaches the calipering roll 6. Since the centers of the rolls 4 and 6 are about six inches apart the work travels six inches into the machine before release of the timing mechanism carried by the shaft 200. Subsequently and in accordance with adjustment of the cams 196 and 198 of said timing mechanism, the indicating mechanism becomes operative to indicate the results of calipering operations performed by the calipering rolls 4 and 6 in cooperation with the work-backing rolls 8 and 10, respectively. While the indicating means is operative, the effect of movements of the calipering rolls 4 and 6 is transmitted through the connections described to the mirrors which are the important elements of the special indicating means shown. Since the caliper rolls 4 and 6 are connected by the equalizing lever 104, and further transmit movement only through said equalizing lever 104, each high or low spot in the path of the calipering rolls is substantially halved. In this way the effect of individual high and low spots in the work is moderated considerably over what would be obtained if each individual high or low spot were given its full value. Because of this arrangement a much more accurate determination of the thickness of a given piece of work may be obtained than has heretofore been possible in constructions wherein each high or low spot was permitted to register its full effect upon the indicating means. It will be recalled that movements of the calipering rolls 4 and 6 away from the corresponding work-backing rolls 8 and 10, respectively, effect adjusting movements of the connecting rod 130 (Fig. 9) in a direction to record the effect of successively thicker portions of the work in the path of the calipering rolls, while movements of the calipering rolls 4 and 6 toward the work-backing rolls 8 and 10 as thinner spots in the work are encountered, have the effect of moving the connecting rod 142 (Fig. 9) in a direction to register the final effect of successively encountered low spots in the work found in the path of calipering rolls.

It will be understood furthermore that the mirror 164 is connected to indicate the final movement of the connecting rod 130 (Fig. 9) while the mirror 166 is connected to indicate the movements of the connecting rod 142 (Fig. 9). Hence, these two mirrors give the results of the encounter by the calipering rolls of the relatively thick and thin spots, respectively, in the work, modified by the operation of the equalizing lever 104 as already described. Since the mirror 174 is adjusted by the mirror carriers of mirrors 164 and 166 through the equalizing lever 182 (Fig. 8), the mirror 174 will present a reading substantially halfway between that of mirrors 164 and 166. Hence the effect of high and low spots in the path of the calipering rolls is halved for the second time, and the line of light projected by mirror 174 is depended upon in reading the indicator scale for the thickness dimensions of different pieces of work.

In operating the illustrated machine, a piece of work such as a skin 3 is placed upon the feeding-in table 24 by drawing it while folded over the rounded end of the table from which it may be readily shifted upon the continuously running cable 2. By the cable the work is carried, with substantially equal portions thereof suspended in vertical planes upon each side of the cable, into the field of calipering operations, that is, into position between the calipering rolls 4 and 6 and the work-backing rolls 8 and 10. With the work thus positioned, the calipering rolls engage a double thickness of the work along a line about an inch or two below the cable and parallel therewith. When the work during its travel reaches the second calipering roll 6, the timing cam mechanism controlled by the said calipering roll becomes operative to initiate operation of the indicating means at a predetermined or measured distance from the front or entering end of the work. When the calipering roll 4 drops off the rear or following end of the work, the locking lever 213 is moved to releasing position (Fig. 3) so that the cams are rotated until brought to rest by pawl 202. At a predetermined point in this rotation, the lever 214 (Figs. 3, 8 and 11) is released thus permitting movement of the levers 162 to the inoperative position shown in Fig. 8 and leaving the mirrors in indicating position.

It is clear therefore that measuring operations are performed only with respect to an intermediate portion of the work where the best grade of leather is found. In other words, the neck and shoulder portions and commonly a part of the butt portion of the skin are disregarded in the measuring operations by which the skin is graded for thickness. In the continued movement of the cable 2 the leading end of the piece of work rides upon the inclined surface of the delivery table 28 where the work is held until removed by the workman who places each piece of work upon the proper stack in accordance with the reading of the indicator.

Having described my invention, what I claim as new and desire to secure by Letters Patent of the United States is:

1. In a thickness measuring machine, a support constructed and arranged to receive a folded piece of work, calipers arranged for engagement with the double layers of the folded piece of work to caliper thickness dimensions thereof, said work support having a surface disposed laterally of and parallel to a line connecting said calipers to guide the fold in the work and to resist displacement of the folded work piece laterally in relation to the calipers, and means to cause relative movement of the calipers and the folded piece of work in a direction parallel to the fold in the work constructed and arranged to cause the calipers to engage the work along a line in spaced relation to the fold.

2. In a thickness measuring machine, calipers to engage the work, a member constructed and arranged to support a folded piece of work and to serve as a guide to position it, by engagement with the inner surface of the fold, while in the field of calipering operations in such manner that a double layer of the work is engaged by the calipers along a line spaced from and parallel to the fold in the work, and means to cause relative movement between the said member and the work calipers whereby double layers of the work are calipered in a plurality of points along said line in spaced relation to the fold in the work.

3. In a thickness measuring machine, members for calipering the thickness dimensions of pieces of work, a work supporting member adapted to have a folded piece of work placed thereon with portions hanging suspended from the line of support and so arranged relatively to the calipering members that the latter engage two layers of the work below the line of suspension thereof, and means to cause relative movement between the calipering members and the pieces of work.

4. In a thickness measuring machine, members for calipering thickness dimensions of pieces of work, a cable over which a piece of work may be folded with portions thereof hanging suspended from the line of support, said cable being arranged to support the piece of work in such manner that a double layer of the work is engaged by the calipering members along a line parallel to the cable and just below the latter, and means to cause relative movement between the calipering members and the piece of work whereby the latter is calipered at a plurality of points in said line.

5. In a thickness measuring machine, members for calipering thickness dimensions of pieces of work, and a work supporting member the width and thickness dimensions of which are very much less than its length dimension, said member being adapted to have a folded piece of work placed thereon with portions hanging suspended from the line of support and so arranged relatively to the calipering members that the latter engage two layers of the work below the line of suspension thereof.

6. In a thickness measuring machine, members for calipering thickness dimensions of pieces of work, and a cable over which a piece of work may be folded with portions thereof hanging suspended from the line of support, said cable being movable and so arranged relatively to the work calipering members as to carry the piece of work to and through the latter in such manner that a double layer of the work is engaged by the calipering members along a line parallel to the cable and just below the latter.

7. In a thickness measuring machine, members for calipering thickness dimensions of pieces of work, a cable upon which a piece of work may be supported with portions thereof hanging suspended from each side of the cable, and a narrow feeding-in table above one end of the cable upon which a piece of work may be preliminarily placed and from which it may be pushed while in folded condition into engagement with the cable.

8. In a thickness measuring machine, work calipering means, an endless cable upon which a piece of work may be supported with portions thereof hanging suspended from each side of the cable, said cable being movable to carry pieces of work to and through said calipering means, and a combined feeding-in table and guard member upon which a piece of work may be preliminarily placed and from which it may be pushed while in folded condition into engagement with the cable, said guard member having side portions to prevent suspended portions of the work from engaging with the return run of the cable and said table having a portion above the operative run of the cable to hold the work out of contact with the cable during preliminary positioning of the work in folded condition above the cable.

9. In a thickness measuring machine, work calipering means, and a cable over which a piece of work may be folded with portions thereof hanging suspended from the line of support, said cable being movable and so arranged relatively to the work calipering means as to carry the piece of work to and through the latter in such manner that a double layer of the work is engaged by the calipering means along a line parallel to the cable and just below the latter, and a delivery table at the delivery end of the work-carrying stretch of the cable arranged to present an inclined surface rising above the cable at said end thereof so that each piece of work in turn may ride upwardly on the delivery table during its movement with the cable and be held for removal by the workman.

10. In a thickness measuring machine, a plurality of calipering rolls arranged in sets to engage opposite sides of a piece of work, said rolls being disposed in a horizontal plane, a member adapted to support a piece of work suspended in a vertical plane between the sets of rolls, power means to drive all the calipering rolls at the same peripheral speed to progress the piece of work past said rolls whereby the piece of work is calipered at a plurality of points in the path of the rolls, an equalizing lever pivotally connected to the rolls of one set, and indicating means responsive to movements of said lever to indicate a dimension of the work being measured.

11. In a thickness measuring machine, a plurality of calipering rolls arranged in sets to engage opposite sides of a piece of work, said rolls being disposed in a horizontal plane, an endless cable adapted to support the piece of work in a vertical plane passing between the sets of rolls, means to drive the cable and also the calipering rolls at a peripheral speed corresponding to the rate of movement of the cable whereby pieces of work are fed smoothly through the field of calipering operations, and means responsive to the movement of one set of calipering rolls for indicating a dimension of the piece of work being measured.

12. In a thickness measuring machine, a plurality of calipering rolls and an equal number of work-backing rolls arranged to engage opposite sides of a piece of work, said rolls being disposed in a horizontal plane, a member adapted to support a piece of work suspended in a vertical plane between the sets of rolls, means to drive the work-backing rolls to progress the piece of work past the calipering rolls whereby the piece of work is calipered at a plurality of points in the path of the rolls, an equalizing lever pivotally connected to the calipering rolls, and indicating means responsive to movements of said lever to indicate a dimension of the work being measured.

13. In a thickness measuring machine, a plurality of calipering rolls and an equal number of work-backing rolls arranged to engage opposite sides of a piece of work, said rolls being disposed in a horizontal plane, an endless cable adapted to support the piece of work in a vertical plane passing between the sets of rolls, means to drive the cable and also the work-backing rolls at a peripheral speed corresponding to the rate of movement of the cable whereby pieces of work are fed smoothly through the field of calipering operations, and means responsive to the movement of the calipering rolls for indicating a dimension of the piece of work being measured.

14. In a thickness measuring machine, a plurality of calipering rolls arranged in line with each other in the direction of travel of a piece of work being measured, work-backing rolls arranged opposite to the calipering rolls to cooperate therewith in calipering the work, pivoted levers each serving individually as a support for one of the calipering rolls, an equalizing lever connected to the calipering rolls, power means to drive the calipering rolls at the same peripheral speed, indicating means, and connections between the equalizing lever and the indicating means to cause the latter to be responsive to movements of the calipering rolls whereby a dimension of the piece of work being measured is indicated by the indicating means.

15. In a thickness measuring machine, a plurality of calipering rolls arranged in line with each other in the direction of travel of a piece of work being measured, work-backing rolls arranged opposite to the calipering rolls to co-operate therewith in calipering the work, pivoted levers each serving individually as a support for one of the calipering rolls, an equalizing lever connected to the calipering rolls, chain and sprocket members arranged to drive the calipering rolls at the same peripheral speed, one of said sprockets having its axis of rotation closely adjacent to the pivotal mounting of one of said pivoted levers, indicating means, and connections between the equalizing lever and the indicating means whereby the latter is rendered responsive to movements of the calipering rolls.

16. In a machine for measuring thickness dimensions of pieces of work, calipering rolls arranged in sets in a horizontal plane and upon opposite sides of a vertical plane, a cable adapted to support a piece of work suspended in said vertical plane, means to drive the cable and also the calipering rolls, the latter at a common peripheral speed corresponding to the rate of travel of said cable, whereby the piece of work is smoothly fed between the sets of calipering rolls, indicating means, and connections between the calipering rolls and the indicating means to cause the latter to be responsive to the movements of the calipering rolls.

17. In a thickness measuring machine, a work support, calipering members spaced from each other in the direction of movement of the work, pivotally supported members arranged to support said calipering members, said pivoted members comprising an equalizing member pivoted at its center and pivotally connected to said calipering members whereby movements of the calipering members due to variations in the thickness of the work are averaged through said equalizing member, indicating means, and means controlled by one of said calipering members for initiating operation of the indicating means.

18. In a thickness measuring machine, a work support, calipering rolls spaced from each other in the direction of movement of the work, pivotally supported members arranged to support said calipering rolls, said pivoted members comprising an equalizing member pivoted at its center and pivotally connected to said calipering rolls whereby movements of the calipering rolls due to variations in the thickness of the work are averaged through said equalizing member, indicating means, and a cam member arranged to be driven by one of said calipering rolls and having connections operative to initiate operation of said indicating means.

19. In a thickness measuring machine, a work support, a plurality of calipering rolls in line with each other in the direction of feed of the work, indicating means, connections between the calipering rolls and the indicating means by which the latter are caused to be responsive to the former, a timing mechanism connected to control the indicating means and arranged to be driven from the calipering roll first encountered by the work, and connections between the second calipering roll and the timing mechanism to initiate operation of the latter.

20. In a thickness measuring machine, a work support, a plurality of calipering rolls in line with each other in the direction of feed of the work, indicating means, connections between the calipering rolls and the indicating means by which the latter are caused to be responsive to the former, a timing mechanism connected to render the indicating means alternately operative and inoperative and mounted for bodily movement with the first calipering roll and arranged to be driven thereby, said bodily movement of the timing mechanism positioning it for control by the second calipering roll, and connections between said second calipering roll and the timing mechanism to initiate operation of the latter whereby measurement of each piece of work begins at a predetermined distance from the front or entering end of the piece of work.

21. In a thickness measuring machine, a pair of calipering rolls arranged in line with the direction of movement of the work, means for carrying pieces of work past the calipering rolls, means supporting the calipering rolls comprising an equalizing lever, an indicating means, connections between the equalizing lever and the indicating means to render the latter responsive to the former, a timing mechanism connected to control the indicating means and arranged to be driven by the calipering roll first encountered by the work, and connections between the second calipering roll and the timing mechanism to initiate operation of the latter.

22. In a thickness measuring machine, a pair of calipering rolls arranged in line with the direction of movement of the work, means for carrying pieces of work past the calipering rolls, means supporting the calipering rolls comprising an equalizing lever, an indicating means, connections between the equalizing lever and the indicating means to render the latter responsive to the former, a timing cam connected to control the indicating means, means to drive the timing cam from the first calipering roll, and connections from the second calipering roll to initiate operation of the timing cam.

23. In a thickness measuring machine, a work support, a pair of calipering members arranged in line with each other in the direction of travel of the work thereby, means supporting the calipering members comprising an equalizing lever, indicating means comprising three similar thickness indicating units, connections between the equalizing lever and two of the units of the indicating means to cause one of the latter to indicate progressively thicker spots encountered by the calipering members and to cause the other of said two units to indicate progressively thinner spots encountered by said calipering members, and connections between said two units of the indicating means and the third unit, said last-mentioned connections including an equalizing lever operated by said two units to effect movement of said third unit equivalent to an average of the movements of said two units, whereby the effect of the thicker and thinner spots in a given piece of work is averaged in the movements of the last-mentioned equalizing lever while operated by said connections to the first-mentioned equalizing lever.

24. In a thickness measuring machine, a work support, a pair of calipering members arranged in line with each other in the direction of travel of the work thereby, means supporting the calipering members comprising an equalizing lever, indicating means comprising three similarly mounted mirrors effective to indicate thickness dimensions, connections between the equalizing lever and two of the mirrors to cause one of the mirrors to indicate progressively thicker spots encountered by the calipering members and to cause the other of said two mirrors to indicate progressively thinner spots encountered by said calipering members, and connections between the third mirror and the two mirrors first mentioned, said last-mentioned connections including an equalizing lever operated by said two mirrors to effect movement of said third mirror equivalent to an averaging of the movements of said two mirrors, whereby the effect of the thicker and thinner spots in a given piece of work is averaged in the movements of the last-mentioned equalizing lever while operated by said connections to the first-mentioned equalizing lever.

ERASTUS E. WINKLEY.